Dec. 27, 1966     A. J. ROSSI     3,294,038
CONTINUOUS VACUUM CANDY COOKER
Filed Feb. 18, 1964
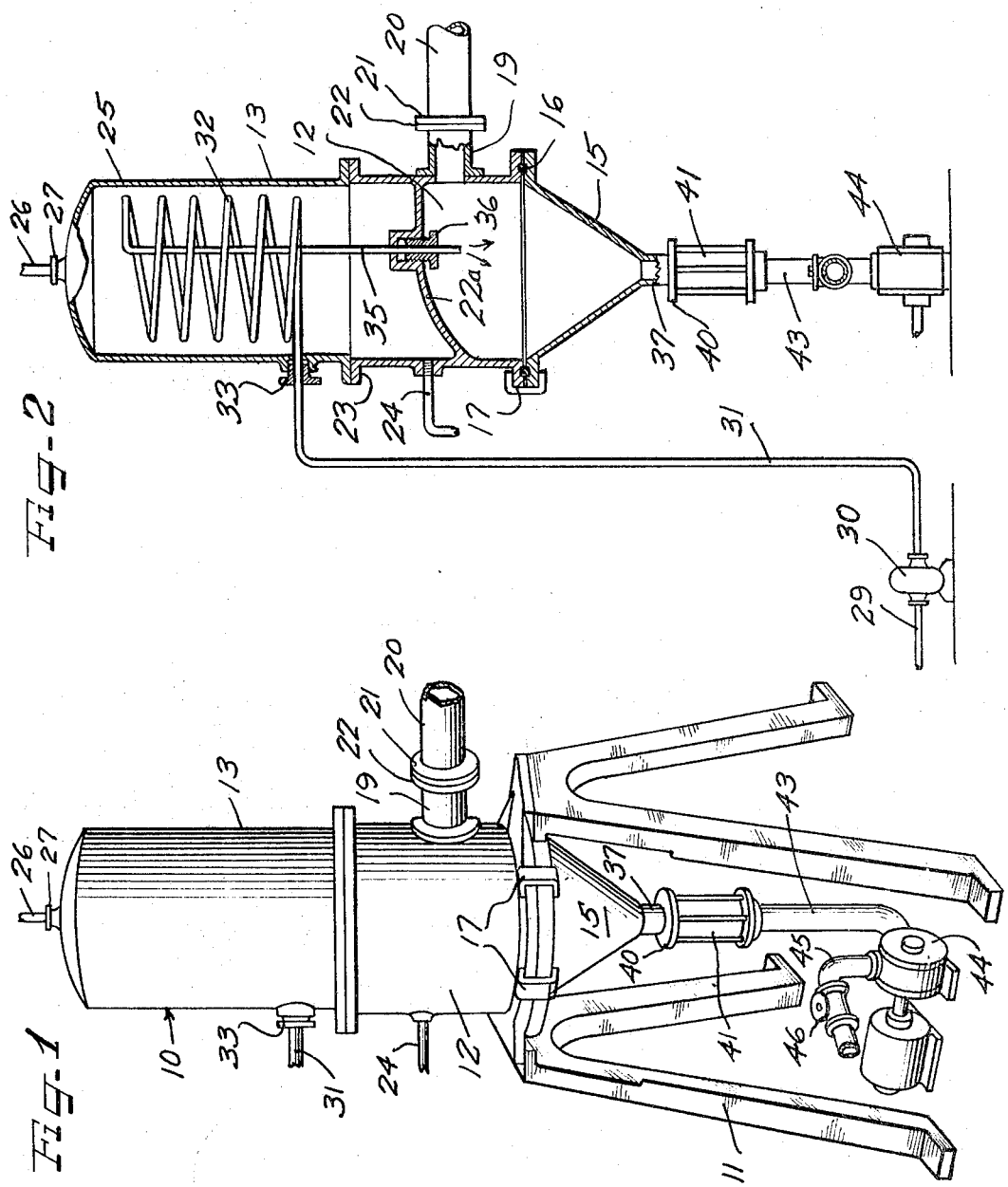
INVENTOR.
Anthony J. Rossi
BY
ATTORNEYS United States Patent Office 3,294,038
Patented Dec. 27, 1966

3,294,038
CONTINUOUS VACUUM CANDY COOKER
Anthony J. Rossi, 40 Kashey St., Clifton, N.J. 07013
Filed Feb. 18, 1964, Ser. No. 345,634
4 Claims. (Cl. 107—4)

This invention relates to a continous vacuum candy cooking apparatus.

In the cooking of candy by the conventional vacuum candy cookers, the cooker usually has a receiving pot or kettle mounted for movement into and out of registry with the discharge from the vacuum chamber of the cooker. Usually two or more receiving pots are mounted on a track forming a part of the frame structure of the cooker and are moved along this track into and out of registry with the vacuum chamber of the cooker. The pot in registry with the vacuum chamber of the cooker is sealed to the cooker to accommodate excess moisture to be drawn from the candy by vacuum and at the end of a cooking cycle. When transferring from one kettle to another, the vacuum valve is opened, the vacuum seal is broken and the full kettle is moved out of registry with the vacuum chamber, while an empty kettle is brought into registry with the vacuum chamber. The empty kettle must then be sealed to the vacuum chamber to provide the required seal. The vacuum valve may then be closed.

With such cookers, the product is cooked in a steam chest above the vacuum chamber in a continuous flow through a coil in the chest and cannot be stopped in the hot coil through which it flows without damage to the product. The product, therefore, continues to flow through its coil, while the vacuum is drawn. A cooking cycle usually requires six minutes per kettle and when an empty kettle is put into position beneath the vacuum chamber, the cooker must get back to stable operating conditions, the time of which varies in accordance with the ability to establish the required vacuum in the vacuum chamber, with the result that the finished product also varies.

The principal object of the present invention is to remedy the foregoing disadvantages in vacuum candy cookers by providing an improved form of apparatus for removing the product as cooked in a continuous operation and thereby maintaining the operating conditions of the cooker stable during the candy cooking operation.

A further object of the invention is to provide a novel and improved vacuum candy cooker so constructed and arranged as to enable large batches of candy to be cooked by a continuous process and to avoid the unstable operating conditions heretofore encountered by changing the receiving pots when filled with cooked candy.

These and other objects of the invention will appear from time to time as the following specification proceeds and with reference to the accompanying drawing wherein:

FIGURE 1 is a perspective view of a vacuum candy cooker constructed in accordance with the principles of the present invention; and FIGURE 2 is a fragmentary transverse sectional view taken through the apparatus shown in FIGURE 1 with certain parts removed.

In the embodiment of the invention illustrated in FIGURES 1 and 2 of the drawings, I have shown in FIGURE 1 a candy cooker 10 mounted on a stand 11, bolted or otherwise secured to the floor. The stand 11 forms a support at its top for a vacuum chamber 12 and a steam chest 13 extending above said vacuum chamber and sealed thereto. The vacuum chamber has a converging generally conical product receiver 15 extending about its lower end and sealed thereto as by seals 16 and clamps 17 clamping said receiver to the bottom of said vacuum chamber and in sealing engagement with the seal 16 to main tain a vacuum therein. The seal 16 and clamps 17 may be of any well known form and are no part of the present invention so need not herein be shown or described in detail.

The vacuum chamber has an outlet or vacuum input fitting 19 leading therefrom, to which is sealed a vacuum input pipe 20 having a flanged end 21 abutting a flanged end 22 of the fitting 19 and sealed and bolted thereto in a conventional manner. The vacuum pipe 20 is connected with a source of vacuum (not shown) which may be an evacuator or series of evacuators of a type conventionally used in candy cookers.

The vacuum chamber 12 terminates into a partition 22a. The wall structure extending above the vacuum chamber has a flange 23 extending laterally of its upper end portion and forming a mounting for the steam chest 25, which is retained to said flange in sealing engagement therewith by suitable retaining means, such as, nuts and bolts (not shown).

The steam chest 25 has a steam line 26 leading thereinto through the top thereof and sealed thereto by a packing gland 27. Spent steam and condensate is drawn from the steam chest through a condensate line 24 leading from the steam chest 13 from above the partition 22a. The condensate line in turn may be connected to a conventional form of steam trap.

The product is first premixed at which time it may be heated to sufficiently stabilize the temperature of the product and is then pumped through an inlet line 29 and pump 30 through a feed line 31 into the steam chest 25 along the lower end thereof and upwardly along the steam chest in a spiral path through a coil 32. A packing gland 33 is provided to seal the feed line to the steam chest as it leads thereinto. The coil 32 forms a product heating coil and extends upwardly along the steam chest to a position adjacent the top thereof and then turns downwardly into a product discharge end portion 35 leading through the partition 22 into the vacuum chamber 12. A packing gland 36 is provided to seal the discharge end portion 35 of the coiled product line to the vacuum chamber 12.

Steam passes into the steam chest 25 through the steam line 26 at a temperature equal to or slightly above the cooking temperature of sugar. The product is therefore cooked in the steam chest as it flows along the coil 32 and downwardly along the discharge line 35, through which the cooked product passes into the vacuum chamber and product receiver 15, where excess moisture is removed therefrom by vacuum.

The product receiver 15 converges to a pipe 37 leading from its lower end and sealed to a flange 40 of a product level sight glass 41. The product level sight glass 41 in turn is connected with a discharge line 43 leading to a pump 44. The pump 44 has a delivery line 45 connected with its outlet having a check valve 46 therein. The delivery line 45 on the downstream side of the check valve thus delivers a cooked candy product of a uniform moisture content, for further processing.

The pumps 30 and 44 may be standard forms of positive pumps commonly used to pump heavy materials, such as viscous materials, one form of pump which is particularly suitable being a pump known to the trade as a "Moyno" pump. The pump 44 and check valve 46 act as a vacuum seal to maintain the vacuum chamber 12 at the required vacuum.

In carrying out the invention, the product may first be mixed in a holding kettle and may be heated in the holding kettle to a stabilizing temperature. The vacuum may then be turned on to form a vacuum in the vacuum chamber 12. Steam may then be admitted to the steam chest 13 through the steam line 26 and water may be removed from the bottom of the steam chest through the steam condensate line 24. When the conditions within the cooker becomes stabilized, the product feed pump 30 may then be turned on and the premixed product may be fed by the product feed pump 30 along the product feed line 31 into the steam chest 25, and upwardly along the coils 32 in said steam chest to the top thereof and then downwardly into the vacuum chamber 12, where excess moisture is removed from the product by vacuum. The product may then pass through the product receiver 15 and downwardly along the product level sight glass 41. When the product shows in the sight glass 41, the product discharge pump 44 may then be turned on and the product in a cooked state of a uniform consistency and moisture content is forced through the delivery line 45 for further processing. The operation may then continue for an indefinite period of time as long as there is a mixed product in the holding kettle, and the operation being continuous with no breaking of the vacuum and the necessity of establishing a vacuum during emptying of one receiving pot and the placing of a second receiving pot in position as has previously been the case, there will be no variation in the product from the beginning to the end of the cooking cycle.

While I have herein shown and described one form in which the present invention may be embodied, it may readily be understood that various variations and modifications in the invention may be attained without departing from the spirit and scope of the novel concepts thereof.

I claim as my invention:

1. A continuous vacuum cooking apparatus for cooking candy and the like, comprising a steam chest, a pipe leading into said steam chest and extending therealong and having a discharge end opening downwardly through the bottom of said steam chest, a vacuum chamber in association with said steam chest and in receiving relation with respect to said pipe, a vacuum output line leading from said vacuum chamber and having connection with a source of vacuum for withdrawing excess moisture from the cooked product discharged therein, and a pump in product receiving relation with respect to said vacuum chamber and continuously pumping the cooked product therefrom.

2. A continuous vacuum cooking apparatus for candy and the like comprising, a steam chest, an inlet for steam leading into one end of said chest and a discharge outlet leading from the bottom of said chest, a product feed line for a mixed candy sugar product leading into said steam chest adjacent the lower end thereof, a helical coil forming a continuation of said feed line and leading upwardly along said steam chest to a position adjacent the top thereof, a discharge line forming a downward continuation of said coil and leading from the lower end of said steam chest and having a downwardly opening discharge end, a vacuum chamber in product receiving relation with respect to said discharge line, a vacuum output line leading from said vacuum chamber for maintaining a predetermined vacuum therein and drawing excess moisture from the cooked candy product, a discharge line leading downwardly from said vacuum chamber, a pump pumping the candy product through said discharge line, and a sight glass in said discharge line enabling the operator to determine the passage of the product therethrough and thereby determine the period of starting said pump.

3. In a vacuum cooking apparatus for candy and the like, a steam chest, a steam inlet leading into said steam chest adjacent the top thereof, a condensate line leading from said steam chest adjacent the bottom thereof, a vacuum chamber beneath said steam chest and sealed therefrom, a vacuum output line leading from said vacuum chamber and connected with a source of vacuum, a product feed line for a mixed sugar candy product, a pump pumping the mixed sugar candy product through said product feed line, a coil extending upwardly along said steam chest to a position adjacent the top thereof and forming a continuation of said product feed line, said coil having a downwardly extending discharge end portion opening into said vacuum chamber, and means pumping the cooked product from said vacuum chamber and maintaining a vacuum therein comprising a pump, a discharge line leading from said vacuum chamber to said pump, a delivery line leading from said pump, and a check valve in said delivery line.

4. A vacuum candy cooker in accordance with claim 3 wherein a sight gauge is provided in said discharge line to determine the passage of the cooked product therealong and the time of starting said product discharge pump.

References Cited by the Examiner

UNITED STATES PATENTS

| 1,215,024 | 2/1917 | Hohberger | 107—4.7 |
| 1,756,662 | 4/1930 | Reed | 107—4.7 |

FOREIGN PATENTS

| 630,521 | 5/1936 | Germany. |
| 936,842 | 12/1955 | Germany. |

WILLIAM I. PRICE, *Primary Examiner.*